United States Patent [19]

Higuchi et al.

[11] Patent Number: 4,819,322
[45] Date of Patent: Apr. 11, 1989

[54] METHOD FOR MANUFACTURING A FLAT COIL

[75] Inventors: Shigetaka Higuchi; Isao Noguchi; Shuji Kurita; Yasutomo Kodachi, all of Tochigi, Japan

[73] Assignee: Sony Corporation, Tokyo, Japan

[21] Appl. No.: 58,560

[22] Filed: Jun. 5, 1987

[30] Foreign Application Priority Data

Jun. 8, 1986 [JP] Japan .................................. 61-132513
Feb. 2, 1987 [JP] Japan .................................. 62-22028

[51] Int. Cl.⁴ .............................................. H01F 7/06
[52] U.S. Cl. ........................................ 29/605; 29/606;
219/69.17; 336/206; 336/232; 336/222
[58] Field of Search ................. 29/605, 606; 336/232,
336/223, 222, 206; 219/69 M, 69 RS, 69 D

[56] References Cited

U.S. PATENT DOCUMENTS

| | | | |
|---|---|---|---|
| 2,998,583 | 8/1961 | Worcester | 336/232 |
| 3,112,556 | 12/1963 | Zack | 29/605 |
| 3,202,592 | 8/1965 | Carmichael et al. | 29/605 |
| 3,225,269 | 12/1965 | Worcester | 336/223 |
| 4,495,038 | 1/1985 | Inoue | 219/69 M |

FOREIGN PATENT DOCUMENTS 806452 12/1958 United Kingdom .
1462109 1/1977 United Kingdom .

Primary Examiner—P. W. Echols
Attorney, Agent, or Firm—Hill, Van Santen, Steadman & Simpson

[57] ABSTRACT

A process for producing a flat coil of high reliability and free from the problem of short-circuiting, and capable of high productivity. The process includes steps of forming an insulator layer on a metal foil ribbon, winding the metal foil around a center shaft or mandrel while pressing the insulator layer toward the center shaft to form a rolled up metal foil body. A strip electrode of conductive metal may be integrally attached to the inner or outer periphery of the coil or both to provide electrical connection to the turns. An insulating resin layer may be formed at an outer end of the metal foil, and a metal reinforcing layer can be formed on the outer periphery of the rolled up body other than at the insulating resin layer by electroplating to form a coil block. The rolled up body or coil block is then cut by electric discharge machining in a direction transverse to the center shaft to form flat coils at a predetermined thickness.

11 Claims, 7 Drawing Sheets

METHOD FOR MANUFACTURING A FLAT COIL

BACKGROUND OF THE INVENTION

1. Field of the Invention

The present invention relates to a process for producing a flat coil for use in an electric motor, a deflecting coil, a transformer or the like and is specifically directed to a process for producing a flat coil by cutting up the rolled body of metal foil.

2. DESCRIPTION OF THE PRIOR ART

Conventionally, a coil of the wound type utilizing a copper wire wound in layers is employed as a coil for an electric motor or in the deflecting yoke of a cathode ray tube. As the size of the apparatus is reduced, the so called flat coils of very substantially reduced thickness have been developed and put into practical use. For example, a sheet coil can be produced by etching a sheet of copper foil laminated with an insulator sheet in a spiral pattern in a line having a width of 50 microns or so and used as a coil for a flat motor. Employing such a thin sheet coil significantly contributes to flattening and miniaturizing of motors.

While such a sheet coil is very effective for flattening appliances, the mass production of such sheet coils is difficult because it requires an etching technique of very high accuracy. Since such a special technique is necessitated, the coils cannot be produced readily by every manufacturer.

There has been a disclosure of a process wherein a web of copper foil to which an insulator film is applied is rolled up and cut into round slices in order to produce flat coils. However, such a process has not been put into practical use due to the problems of reliability and applicability to mass production. In particular, it is difficult to cut a rolled up sheet of copper foil into round slices of a predetermined axial length, that is, into flat coils of a predetermined thickness. Where, for example, a mechanical means or a laser beam is used for such cutting, there is a possibility that a burr may be produced on a cut face which causes short-circuiting of the coil produced. In order to eliminate such a shear drop on a cut face, the face must be polished smoothly. This step normally requires very much labor and much operating time. Accordingly, the use of the proposed disclosure is not well suited for mass production.

When it is attempted to produce flat coils by cutting a rolled up body of copper foil, conventional cutting methods are not employed in mass production since their capacity does not match their cost, because processing after cutting is difficult, and because too high an overall cost is required.

For example, investigation made by the inventors of the present invention has revealed that when a rolled up body of overlapping sheets of conductor foil with an insulating film is cut by electric discharge machining, particularly where a very thin conductor foil is used, there is the possibility that the strength of a portion of the conductor foil at an outer peripheral portion thereof may be insufficient so that a so called turnup may appear. This results in reducing the cutting speed. A portion of the conductor foil at the outer peripheral portion of the coil may also be cut so that the coil thus produced is defective. In the worst case, cutting itself may be impossible.

Further, a flat coil produced by this process still has drawbacks in that it is deformed as a result of the cutting and that the strength of the terminal portions is not sufficient.

SUMMARY OF THE INVENTION

The present invention provides a process for producing a flat coil which eliminates drawbacks of the conventional processes as described above, and by which flat coils of high reliability can be produced with a high productivity and without causing short-circuits after a rolled up body of the metal foil is cut.

The present invention provides a process for producing a flat coil which permits effective cutting of a rolled up body of conductor foil at high speed and at high productivity even where the strength of the conductor foil is very low.

The present invention makes use of electric discharge machining of a rolled up body of metal foil. According to one aspect of the invention, there is formed an insulator layer on a ribbon of metal foil, and the resulting metal foil with the attached insulator layer is formed around a center shaft or mandrel while pressing the insulator layer toward the center shaft to form a rolled up body of metal foil. The rolled up body is then cut in a direction transverse to the center shaft into flat coils of a predetermined thickness by electric discharge machining.

In accordance with another aspect of the present invention, there is provided a flat coil which comprises alternating metal foil layers and insulated layers which project beyond the metal layers in cross section of the flat coil. The flat coil is produced by cutting through the use of electric discharge machining on a rolled up body of metal foil or a block coil consisting of a rolled up body of metal foil formed by winding metal foil and an insulator film into alternate layers to form a plurality of slices each of which provides a flat coil.

In accordance with another aspect of the present invention, there is provided a process for producing a flat coil which includes the steps of forming an insulator layer on the metal foil, winding the metal foil with the insulator formed thereon about a center shaft while pressing the insulator layer toward the center shaft to form a rolled up body of metal foil, and attaching a metal electrode member in the form of a strip in an integral relationship to at least the inner or outer periphery of rolled up body over the entire width thereof, thereby forming a coil block. This block is cut in a direction transverse to the center shaft into flat coils of a predetermined thickness by electric discharge machining.

In a still further embodiment of the invention, there is provided a process for producing a flat coil which includes the steps of forming an insulator layer on the metal foil, winding the metal foil with the insulator layer thereon about a center shaft while pressing the insulator layer toward the center shaft to form a rolled up body of metal foil, attaching a metal terminal member in the form of a strip in integral relationship to an inner or outer periphery of the rolled up body over the entire width of the rolled up body so as to electrically connect the strip to the metal foil of the rolled up body. An insulating layer of resin is formed at a terminal end portion of the metal foil at its outermost turn, and the outer periphery of the rolled up body other than the insulating resin layer is covered with a metal reinforcing layer produced by electroplating to form a coil block. This coil block is then cut in a direction transverse to the center shaft into flat coils of a predetermined thickness by electric discharge machining.

When a rolled up body of metal foil with an insulator film laminated thereto is cut by electric discharge machining, it presents a cross section in which insulator layers are projected slightly from layers of the metal foil. Accordingly, the insulation between adjacent layers of the metal foil is maintained, and the possibility of defects such as short-circuits is minimized.

In the case of a flat coil produced by the process of the invention, where a metal reinforcing layer is provided on the outer periphery of the flat coil, the mechanical strength is enhanced by the metal reinforcing member, and the connecting reliability of the terminal elements is also assured.

When an insulating resin layer is provided at a terminal end of the rolled up body, exfoliation of the conductor foil at the terminal end portion of the rolled up body is prevented while at the same time the formation of an electric loop in the metal reinforcing layer is prevented. The formation of the metal reinforcing layer is also advantageous for the production of flat coils because the strength at the outer periphery of the rolled up body is increased. Accordingly, the processing conditions can be made more severe and an increase in cutting speed can be achieved. In addition, the metal reinforcing layer acts to protect the conductor foil on the outer periphery of the flat coil, and so a rolled up body can be cut composed of very thin conductor foil which has been heretofore difficult to cut by conventional means.

In addition, where electric discharge machining is used, a number of rolled up bodies of metal foil can be cut at a time, so that the productivity is substantially increased.

DESCRIPTION OF THE PREFERRED EMBODIMENTS

Figure 3:
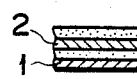
FIG. 3 is an enlarged, partial cross sectional view of the coil sheet of FIG. 2.

In producing a flat coil according to the present invention, a layer of a bonding agent which is to act as an insulator layer is first laminated on copper foil 1 as shown in FIG. 3. In a first embodiment of the present invention, a film 2 of a high molecular weight compound such as a polyimide film is laminated in order to assure the insulation of products with two bonding agents layers 3 and 4 coated on opposite sides of the film 2. The thickness of the copper foil 1 may be about 35 microns while the thickness of each of the bonding agent layers 3 and 4 is about 6 microns. The high molecular weight film 2 is formed from a polyimide film having a thickness of about 13 microns.

Figure 4:
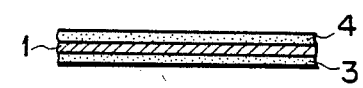
FIG. 4 is a view similar to FIG. 3 but showing a coil stock sheet for the case in which a high molecular weight film is not used.

It should be noted that the high molecular weight film 2 is not always required and, for example, as shown in FIG. 4, the bonding layers 3 and 4 alone may be coated directly on opposite faces of the copper foil 1.

The bonding agents 3, 4 may use an epoxy resin, a phenol resin, a phenoxy resin, an acrylic acid resin, an urethane resin, a polyimide, a polyamide, a mixture of the above resins, nitrile rubber, synthetic rubber, or, a mixture of nitrile or/and synthetic rubber with the above resins.

Figure 1:
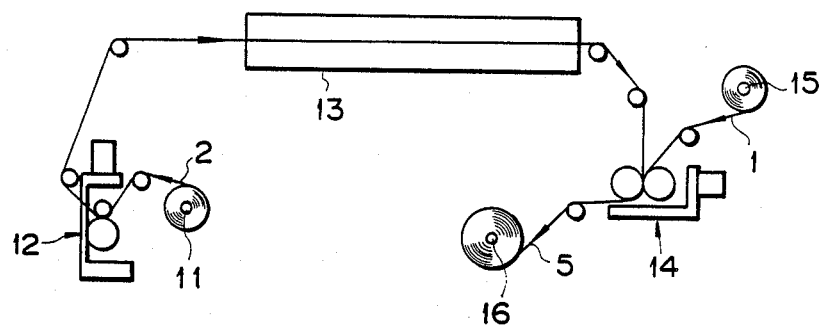
FIG. 1 is a schematic illustration showing the step of forming an insulator layer on copper foil as part of the process of the present invention.

Lamination of the high molecular weight film 2 or bonding agent layers 3 and 4 on the copper foil 1 may be effected using a mechanism such as shown in FIG. 1. A ribbon of a high molecular weight film 2 is supplied from a supply roll 11 and passed through a bonding agent applying machine 12 where a bonding agent is applied to opposite faces of the high molecular weight film 2. Then, the film 2 is passed through a drying apparatus 13 in which the bonding agent layers are dryed into a semidryed condition. The high molecular weight film 2 is then passed through a laminator 14 where it is attached to a web of copper foil 1 supplied from a supply roll 15 and the laminated product is then wound up on a take-up roll 16.

Figure 2:
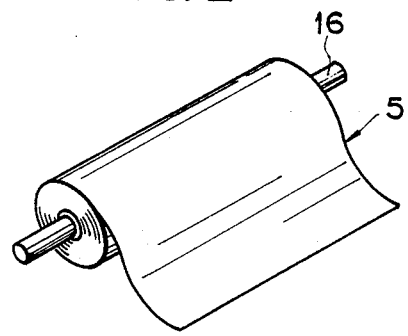
FIG. 2 is a view in perspective showing a coil of sheet stock with an insulator layer applied thereto.
Figure 5:
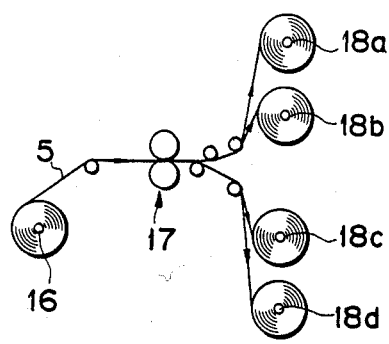
FIG. 5 is a schematic showing of a step of cutting a coil stock sheet.
Figure 6:
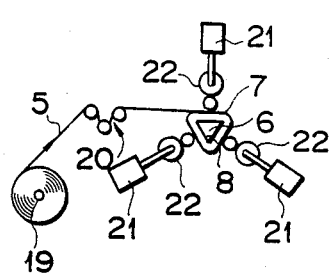
FIG. 6 is a view similar to FIG. 5 but showing the step of winding a coil stock sheet around a core shaft.

By the steps as described, a stock roll of a layered body 5 composed of copper foil 1, high molecular weight film 2, and bonding agent layers 3 and 4 is produced, as shown in FIG. 2. The web from the layered body 5 is delivered from the roll 16 and is cut into four webs of a predetermined width using a cutting machine 17 as shown in FIG. 5.

Figure 7:
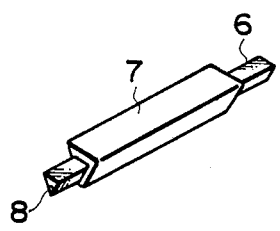
FIG. 7 is a perspective view of the rolled up body wound on the core shaft.

The resulting ribbons are then wound onto a core shaft 6 of a substantially triangular cross section with back tension being applied thereto by tension rolls 20 in order to produce a rolled up body 7 of the layered body 5. When the layered body 5 is wound on the core shaft 6, three heating rolls 22 are urged toward and pressed against the layered body 5 in three directions by the action of air cylinders 21 so as to regulate the wound condition of the rolled up body 7. As the heating rolls 22 are pressed against the layered body 5 in this manner, adjacent turns of the layered body 5 are adhered to each other by the bonding agent layers 3 and 4. FIG. 7 shows the appearance of a rolled up body 7 produced in this manner.

The shape of a cross section of the core shaft 6 may be varied in accordance with the shape desired and may, for example, be circular, elliptical, rectangular, or polygonal. The conductive metal strip 8 such as a strip of solder may be mounted on the core shaft 6 in order to establish electrical connection with the innermost turn of the layered body 5 to be wound on the core shaft 6. Thus, when the layered body 5 is cut into slices to make coils by the steps to be described, a piece of the metal strip 8 on each of the coils serves as one of the lead electrodes.

Figure 8:
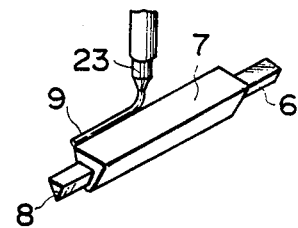
FIG. 8 is a similar view showing the step of attaching a solder bar or strip which is to be formed into an electrode.

Subsequently, another solder strip 9 is attached along a terminal edge of the rolled up body 7 so that when the rolled up body 7 is thereafter cut into rolls, the solder strip 9 may serve as the other lead electrode on each of the coils. The solder strip 9 can readily be formed by extruding a solder material in a softened condition from a nozzle 23 as shown in FIG. 8.

Figure 9A:
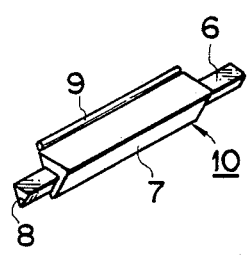
FIGS. 9A and 9B are similar views showing the completed coil blocks.

FIG. 9A is a perspective view showing the appearance of the rolled up body 7 having a solder strip 9 attached along a side edge thereof. As seen in this figure, this results in a block 10 which includes all of the components of a coil including the rolled up body 7 of the copper foil 1, the conductive metal strip 8 which is to form an electrode, and the solder strip 9 which is to form the other electrode of the coil. The block 10 will hereinafter be referred to as a coil block.

Figure 10:
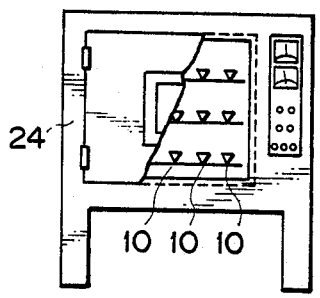
FIG. 10 is a front elevational view, partly broken away, of a heating furnace which can be used for hardening the layer of bonding agent.
Figure 11:
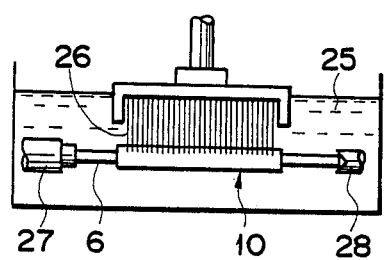
FIG. 11 is a schematic side elevational view showing the step of cutting a coil block by electric discharge machining.

A coil block 10 produced by the steps described above is then placed into a heating furnace 24 as shown in FIG. 10 and heated to a predetermined temperature in order to harden fully the bonding agent layers 3 and 4 interposed between the adjacent turns or convolutions of the rolled up body 7 of the coil blocks 10. Subsequently, the coils blocks are cut into pieces of a predetermined length by an electrical discharge machining.

Electric discharge machining is a non-contact machining method which utilizes pulsed spark discharges at intervals of very short duration within a dielectric liquid coolant. The resulting short arc discharges can be regarded as an extraordinary erosion of metal at a discharge point. Such discharge machining is normally used for processing of a conductor such as formation of a metal mold, but the present inventors have found that the electric discharge machining provides good results also for cutting of a layered body of metal foil and an insulator film. Further details of electrical discharge machining and the theory thereof will be found in Volume 3, Metals Handbook, Eighth Edition (1967) pages 227 to 233. That publication is incorporated herein by reference.

In order to effect electric discharge machining, the coil blocks 10 may be immersed in a dielectric coolant 25. A pulsed current is applied to the coil blocks 10 in the dielectric coolant 25 from plate shaped electrodes 26 arranged in a predetermined spaced relationship, for example, spaced by a distance of 0.4 mm in the longitudinal direction of the core shafts 6. In the present embodiment, a pulsing source having a pulse width of 3 microseconds on and 6 microseconds off, providing a pulse frequency of 111 KHz with a peak current of 10A can be produced using a 20A, 40 to 50 V power source. Either water or dielectrics of petroleum base materials such as kerosene can be used as the dielectric coolant for electric discharge machining.

Figure 12:
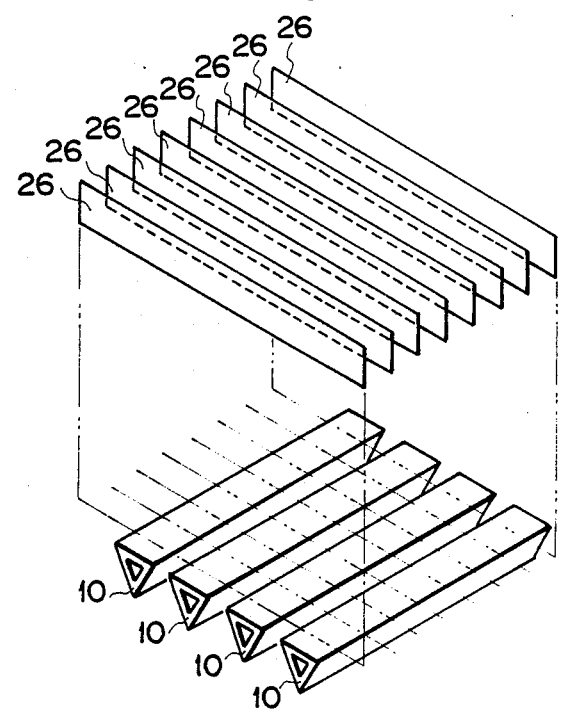
FIG. 12 is a schematic view illustrating an arrangement of electrodes for cutting a plurality of coil blocks at the same time.

In the embodiments shown, the core shaft 6 of a coil block 10 can be secured at opposite ends to a pair of opposing rotatable shafts 27 and 28 and rotated by the latter two or three times through an angle of 120° in order to cut portions of the rolled up body 7 of the coil block 10 corresponding to individual sides of the triangular shape of the core shaft 6. The coil blocks 10 need not necessarily be cut one by one as it is possible, for example, to place a plurality of coil blocks 10 in parallel relationship and cut them at the same time using a plurality of plate shaped electrodes 26 arranged in a predetermined spaced relationship as shown in FIG. 12. Actually, up to 100 coils can be obtained by cutting the coil blocks 10 arranged in a juxtaposed relationship by electrical discharge by means of eleven plate shaped electrodes 26 arranged in spaced relationship by a distance of 0.4 mm.

Figure 13:
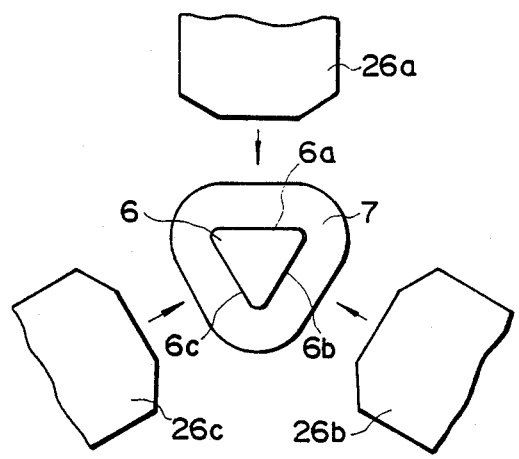
FIG. 13 is a schematic illustration showing a method of cutting a coil block in three directions at a time.

As shown in FIG. 13, it also is possible to arrange three electrodes 26a, 26b, and 26c in an angularly spaced relationship by 120° to confront the three sides 6a, 6b, and 6c of the core shaft 6 of a coil block 10 so that the electrodes may cut the rolled up body 7 wound on the core shaft 6 in three directions at the same time. Where it is desired to cut a coil block by a dimension different than the distance between adjacent electrodes, the electrodes may be moved by a required distance to successively cut the coil block.

When electric discharge machining is carried out, a coil block 10 must necessarily be grounded. Various grounding methods are illustrated in FIGS. 14A to 14D.

Figure 14A:
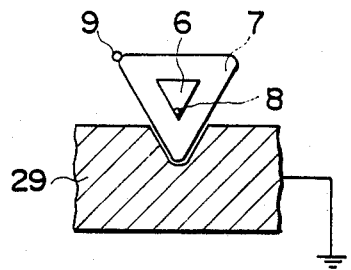
FIGS. 14A to 14E are schematic illustrations showing different met of connecting a coil block to ground.

FIG. 14A illustrates a method wherein a coil block 10 is placed on a metal fixture 29 made of a conductive metal and is grounded directly.

Figure 14B:
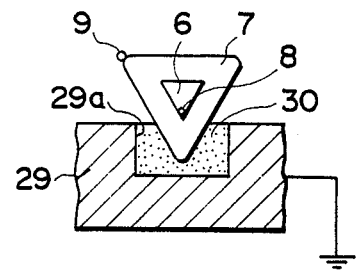

FIG. 14B illustrates another method wherein a coil block 10 is placed on a metal fixture 29 which is grounded similarly as shown in FIG. 14A, but the metal fixture 29 in this case has a groove 29a formed in which a liquid electrically conductive material 30 such as mercury is introduced in order to assure the grounded connection of the coil block 10 even after cutting of the coil block 10 proceeds.

Figure 14C:
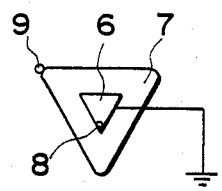

FIG. 14C illustrates a further method wherein the core shaft 6 is formed from a conductive metal material or the like and is grounded directly.

Figure 14D:
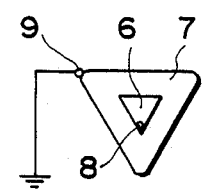

FIG. 14D illustrates a still further modified form wherein the ground is connected to the solder strip 9 which extends along a side edge of the rolled up body 7 of the coil block 10. When the solder strip 9 is connected to the ground, the conductive metal strip 8 at the innermost portion of the rolled up body 7 may also be connected to the ground.

Figure 15:
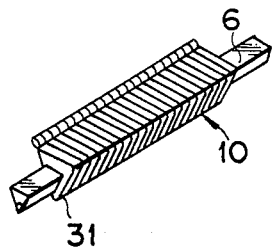
FIG. 15 is a perspective view showing a coil block after cutting.
Figure 16A:
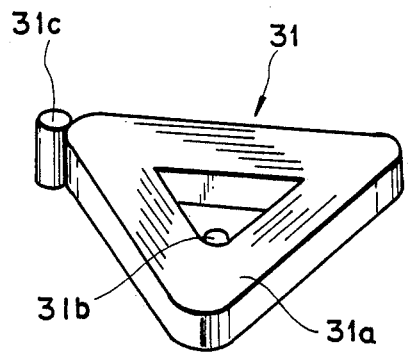
FIGS. 16A and 16B are perspective views showing the flat coils obtained by the present process.

By the electric discharge machining as described above, the coil block 10 is cut into a predetermined number of coils 31 having a predetermined thickness as shown in FIG. 15. FIG. 16A shows the appearance of one of such flat coils 31 after it has been removed from the core shaft 6.

A flat coil 31 obtained in this manner thus includes a rolled up portion 31a of copper foil and insulators, and terminal electrodes 31b and 31c. The flat coil 31 has a very small thickness, and the copper foil 1 is wound or layered very closely. Accordingly, the flat coil 31 is very effective for use as a motor coil.

Figure 17:
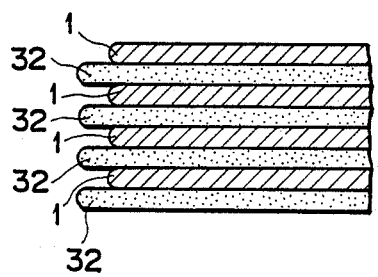
FIG. 17 is an enlarged cross sectional view showing a cross section of a flat coil produced by electric discharge machining.

The inventors have further observed a cut face of a flat coil formed by electric discharge machining with the aid of a microscope. Such observation reveals that, suprisingly the insulator layers 32 composed of the high molecular weight film 2 plus the bonding agent layers 3 and 4 project from the layers of copper foil 1 as shown in FIG. 17, and accordingly, the insulation between adjacent layers of the copper foil 1 is maintained completely.

Figure 18:
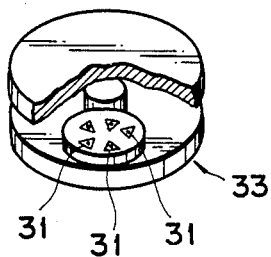
FIG. 18 is a perspective view, partially broken away, showing a lapping device.

While the projections of the insulator layers 32 beyond the metal layers may be left as they are, they may optionally be removed by polishing using a lapping device 33 as shown in FIG. 18 in order to assure the accuracy of the width of the flat coil 31.

The flat coil 31 produced by the steps described above may be incorporated into an electric motor after other steps such as masking terminal portions, coating with a resin material, and inspecting for proper inductance, continuity resistance, and insulation testing. The inventors have actually produced a flat motor having a diameter of about 2.7 mm and a thickness of 2 mm using flat coils 31 obtained in accordance with the present invention.

An improvement in the overall structure of the coils will now be described.

Figure 16B:
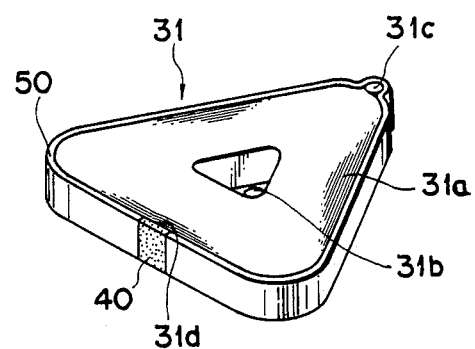

Referring to FIG. 16B, a flat coil produced in accordance with the present invention includes a coil section 31a composed of a rolled body of conductor foil and an insulator film wound into a number of convolutions until predetermined characteristics are obtained. A pair of terminals 31b and 31c are located at opposite ends of the innermost and outermost turns of the rolled up body and provide portions for external connections. A metal reinforcing layer 50 covers the outer periphery of the rolled up body. An insulating resin layer 40 is formed by application of a resin material in the form of a belt to a terminal end 31d of the outermost turn of the coil section 31a. In this manner, the terminal end 31d of the coil section 31a is sealed by the insulating resin layer 40.

The metal reinforcing layer 50 is formed by electroplating a portion of the outer periphery of the coil section 31a other than the insulating resin layer 40. The outermost turn of the conductor foil has a total thickness equal to the thickness of the conductor foil itself and the thickness of the metal reinforcing layer 50.

The flat coil with such construction as described above has the improved mechanical strength by the metal reinforcing layer 50 so that it is resistant to deformation and the like. The terminal 31c provided on the outer periphery of the coil section 31a is enclosed by the metal reinforcing layer 50 and is closely contacted with the conductor foil. Accordingly, the connection of the terminal 31b through the conductor foil is assured while the mounting strength of the terminal 31c is increased.

Since the metal reinforcing layer 50 is partly cut and the insulating resin layer 40 is interposed in the cut space in the metal reinforcing layer 50, the metal reinforcing layer itself does not produce an electric loop nor deteriorate the capacity of the coil section 31a.

In producing a flat coil of the type just described, a rolled up body as shown in FIG. 9A is formed in a manner similar to the first embodiment already described. In this case, however, the copper foil must necessarily be exposed on an outer periphery of the rolled up body 7, and accordingly attention must be paid to the winding direction of the layered body 5 as shown in FIG. 2. Further, when bonding agent layers are formed on opposite faces of a high molecular weight film, it is preferable to remove in advance the bonding agent layer only on an outer face near a terminal end of an outermost turn of the high molecular weight film.

As a subsequent step, a solder strip 9 is attached along the terminal edge of the rolled up body 7 so that when the rolled up body 7 is thereafter cut into coils, the solder strip may serve as one lead electrode on each of the coils. The solder strip 9 can readily be formed by extruding solder material in a softened condition from a nozzle 23.

Figure 9B:
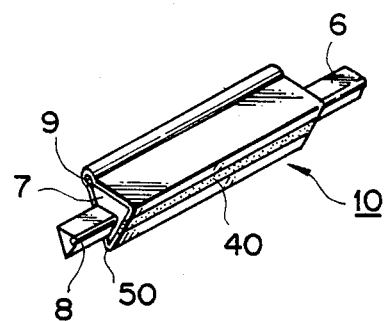

Subsequently, an insulator resin material is applied along the terminal end portion of the outermost turn of the rolled up body 7 to form an insulator resin layer 40 as shown in FIG. 9B. Numerous resin materials can be employed as insulating resin materials 40.

The insulator resin may be a buthyral resin, a phenol resin, an epoxy resin, an urethane resin, or an acrylic acid resin.

Subsequently, a metal reinforcing layer 50 is coated by electrolytic plating of the entire surface of the rolled up body 7 on which the insulating resin layer 40 is provided. The electrolytic plating may be copper plating, nickel plating, zinc plating, chromium plating, solder plating, tin plating or the like.

By means of electrolytic plating, a metal reinforcing layer 50 is formed on a conductor portion of the rolled up body 7 but not on the insulating resin layer 40. Accordingly, the metal reinforcing layer 50 does not form an electric loop.

FIG. 9B is a perspective view showing the appearance of the rolled up body 7 around which the metal reinforcing layer 50 is formed. As seen in this figure, a block 10 includes all the components of the coil including the rolled up body 7, the conductive metal strip 8 which is to later provide one electrode, and the solder strip 9 which is to make the other electrode of the coil, the insulating resin layer 40, and the metal reinforcing layer 50. This block 10 is hereafter referred to as a coil block.

Figure 14E:
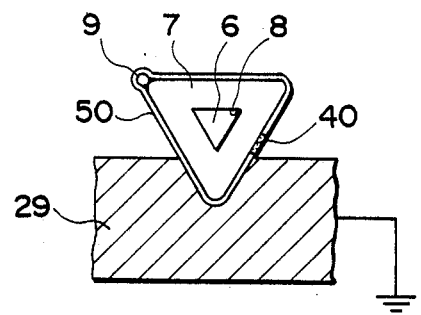

Similarly to the steps described in the first embodiment, the coil block 10 is placed in juxtaposition to an electrode as shown in FIG. 14E and cut into flat coils having a predetermined thickness by electric discharge machining. Since the coil block 10 has a metal reinforcing layer 50 formed thereon, the machining conditions can be made severe and the entire cutting speed can be increased. The cutting speed is largely influenced by the speed upon starting of cutting, and from this point of view, the provision of the metal reinforcing layer 50 is very effective. Since the mechanical strength at the outer periphery of the coil is increased by the formation of the metal reinforcing layer 50, even when a very thin copper foil which can not be cut by conventional means is employed, the coil block 10 can be cut and deformation of the coils after cutting of the coil block 10 can be minimized.

The inventors have produced flat coils under the following conditions and have confirmed improvements in cutting time and in yield rate.

In particular, a bonding agent was first coated with a thickness of about 5 microns after drying on a copper foil having a thickness of 35 microns. The ribbon of the bonding agent coated copper foil was wound into a rolled up body as shown in FIG. 9A.

Subsequently, a resin composition having the following formulation was applied in the form of a belt to a terminal end portion of an outermost turn of the rolled up body. The thickness of the applied layer was 35 microns.

| Component | Parts by Weight |
| --- | --- |
| Butyral resin (S-LEC BX-1, from Sekisui Kagaku K.K. | 100 |
| Phenolic resin (PR50838 from Sumitomo Durez Co. | 60 |
| Ethyl alcohol | 150 |
| Toluene | 330 |
| Acetone | 120 |

The resin composition shown above had a solids content of 20%. The rolled up body with the resin composition applied thereto was put into a copper pyrophosphoric acid plating tank, and electrolytic plating was effected. The plating conditions included a current density of 3 A/dm$^2$; a plating time of 60 minutes; and a plating thickness of 45 microns. A coil block as shown in FIG. 9B was obtained.

This coil block plated as described above was cut by electric discharge machining to produce flat coils. The cutting time and the yield rate were compared with those of flat coils produced without plating. The results are shown in the Table below:

|  | Cutting Time | Yield Rate |
| --- | --- | --- |
| Plated | 31.03 seconds | 67% |
| Not Plated | 49.98 seconds | 34% |

As seen from the Table, cutting time was improved by about 38% while the yield rate was improved by about 30%. It was found possible to cut the resin composition layers without difficulty.

As apparent from their foregoing description, the cutting of the rolled up body by electric discharge machining to form separate coils can be produced conveniently by mass production.

The insulation between adjacent layers of the wound metal foil is completely effective, so there is little chance of any short-circuiting appearing on the products. Thus, flat coils having a high reliability can be produced.

A flat coil produced by the process of the present invention and having a metal reinforcing layer on an outer periphery thereof has improved mechanical strength so that deformation is not a significant problem.

Due to the presence of the metal reinforcing layer, the terminals for external connection can be attached in a stabilized condition to the flat coil, and the terminals themselves can be improved in strength.

Due to the presence of an insulating resin layer intermediate the metal reinforcing layer, the metal reinforcing layer will not form an electric loop at all and so the capacity of the coil is not deteriorated.

Since the rolled up body of conductor foil is cut by an electric discharge machining after a metal reinforcing layer has been formed on an outer peripheral portion by metal plating, even when very thin copper foil which cannot be cut by conventional cutting means is employed, a good cutting can be assured and the cutting speed can be improved. In addition, the process is a very simple process which does not require a special technique or high accuracy so that the process of the invention is very high in practical value.

Having fully described the invention, it will be apparent to those having ordinary skill in the art that changes and modifications can be made thereto without departing from the scope and spirit of the present invention as set forth herein.

We claim as our invention:

1. A process for producing a flat coil, comprising the steps of;
   forming an insulator layer on a ribbon of metal foil,
   winding said ribbon and said insulator layer about a center shaft while pressing the insulator layer toward said center shaft to form a rolled up metal foil body, and
   cutting the rolled up body in a direction transverse to the axis of said center shaft by electric discharge machining into individual flat coils of a predetermined thickness.

2. A process according to claim 1 wherein said rolled up metal foil body is cut by electric discharge machining while it is immersed in a coolant and electrically connected with a liquid electrical conductor in a vessel having a grounded connection.

3. A process according to claim 2 wherein said liquid electrical conductor is mercury.

4. A process according to claim 1 wherein said electric discharge machining is carried out with a pulse current.

5. A process for producing a flat coil comprising the steps of:
   forming an insulator layer on a ribbon of metal foil,
   winding the metal foil and the insulator layer about a center shaft while pressing said insulator layer toward said center shaft to form a rolled up body of metal foil and insulator,
   attaching an electrically conductive strip integrally at least to the inner or outer periphery of the rolled up body over the entire width thereof to form a coil block, and
   cutting the coil block into individual flat coils of predetermined thickness by electric discharge machining.

6. A process for producing a flat coil comprising the steps of:
   forming an insulator layer on a ribbon of metal foil,
   winding said ribbon and its insulator layer attached around a center shaft while pressing the insulator layer toward the center shaft to form a rolled up body of metal foil,
   attaching an electrically conductive metal terminal strip to at least the inner or outer periphery of the rolled up body over the entire width of said rolled up body,
   forming an insulating resin layer at a terminal end portion of said outermost turn of said rolled up body,
   coating the outer periphery of said rolled up body other than said insulating resin layer with an electroplated metal reinforcing layer to form a coil block, and
   cutting the coil block in a direction transverse to said center shaft into flat coils of a predetermined thickness by electric discharge machining.

7. A process according to claim 6 wherein said coil block is cut by electric discharge machining while it is entirely immersed in a coolant and is electrically in contact with a liquid conductor in a grounded vessel.

8. A process according to claim 7 wherein said liquid conductor is mercury.

9. A process according to claim 6 wherein said electric discharge machining is carried out with a pulse current.

10. A process according to claim 6 wherein said rolled up body is formed by winding said metal foil and said insulator film about a shaft having a polygonal cross section.

11. A process according to claim 6 which includes the step of positioning a plurality of said coil blocks in parallel relationship with each other and cutting said blocks by electric discharge machining by means of a plurality of discharge electrodes in a predetermined spaced relationship in a direction transverse to said coil blocks.

* * * * *